(12) United States Patent
Wu

(10) Patent No.: US 8,811,936 B2
(45) Date of Patent: Aug. 19, 2014

(54) METHOD OF HANDLING CALL ORIGINATION AND RELATED COMMUNICATION DEVICE

(75) Inventor: Chih-Hsiang Wu, Taoyuan County (TW)

(73) Assignee: HTC Corporation, Taoyuan, Taoyuan Couty, TW ( * ) Notice: Subject to any disclaimer, the term of this patent is extended or adjusted under 35 U.S.C. 154(b) by 417 days.

(21) Appl. No.: 12/838,503

(22) Filed: Jul. 19, 2010

(65) Prior Publication Data

US 2011/0028120 A1 Feb. 3, 2011

Related U.S. Application Data

(60) Provisional application No. 61/229,725, filed on Jul. 30, 2009.

(51) Int. Cl.
| | | |
|---|---|---|
| *H04M 11/04* | (2006.01) | |
| *H04L 29/06* | (2006.01) | |
| *H04W 36/00* | (2009.01) | |
| *H04W 76/00* | (2009.01) | |
| *H04W 4/22* | (2009.01) | |

(52) U.S. Cl.
CPC ........ *H04L 65/1016* (2013.01); *H04L 65/1069* (2013.01); *H04W 4/22* (2013.01); *H04W 36/0022* (2013.01); *H04W 76/007* (2013.01)
USPC ........ 455/404.1; 455/436; 455/434; 370/331; 370/337; 370/329

(58) Field of Classification Search
CPC ....... H04W 4/22; H04W 76/00; H04W 30/00; H04W 48/18
USPC ........ 455/404.1, 456.1, 404.2, 521, 445, 436, 455/434, 525, 417; 370/329, 336, 401, 328, 370/252, 432, 331, 337, 310; 379/221.08, 379/45, 49; 719/311; 709/249
See application file for complete search history.

(56) References Cited

U.S. PATENT DOCUMENTS

| | | | |
|---|---|---|---|
| 6,240,285 B1 * | 5/2001 | Blum et al. | 455/404.1 |
| 2005/0096024 A1 * | 5/2005 | Bicker et al. | 455/417 |
| 2006/0094397 A1 * | 5/2006 | Raghuram et al. | 455/404.1 |

(Continued)

FOREIGN PATENT DOCUMENTS

| | | |
|---|---|---|
| CN | 101442789 A | 5/2009 |
| TW | 200835368 | 8/2008 |

OTHER PUBLICATIONS

3$^{rd}$ Generation Partnership Project (3GPP) Jun. 2008, 3GPP, 3GPP TS 23.216 v8.0.0, see p. 1.*
Domain, Jun. 13, 2012, Thesaurus.com, see p. 2.*

(Continued)

*Primary Examiner* — Mahendra Patel
(74) *Attorney, Agent, or Firm* — Winston Hsu; Scott Margo

(57) ABSTRACT

A method of handling call origination for a mobile device in a wireless communication system is disclosed. The method comprises the steps of originating a service, establishing a radio resource control (RRC) connection corresponding to the service, receiving a message from a network via the RRC connection, determining whether the network supports the service supported of a first service domain, according to the message and performing the service in a second service domain when the network does not support the service of the first service domain, whereby the RRC connection is not released by the mobile device.

14 Claims, 9 Drawing Sheets

(56) References Cited

U.S. PATENT DOCUMENTS

| | | | |
|---|---|---|---|
| 2008/0102784 A1* | 5/2008 | Mittal et al. | 455/404.1 |
| 2008/0102815 A1 | 5/2008 | Sengupta | |
| 2008/0176564 A1 | 7/2008 | Eerolainen | |
| 2008/0310358 A1* | 12/2008 | Shaheen | 370/329 |
| 2009/0176495 A1* | 7/2009 | Beming et al. | 455/436 |
| 2009/0181676 A1* | 7/2009 | Lee et al. | 455/436 |
| 2009/0268635 A1* | 10/2009 | Gallagher et al. | 370/254 |
| 2010/0142498 A1* | 6/2010 | Hyounhee | 370/337 |
| 2010/0279691 A1* | 11/2010 | Dwyer et al. | 455/436 |

OTHER PUBLICATIONS

Alcatel-Lucent, "Emergency support Indication for IMS emergency call", 3GPP TSG-RAN WG2 Meeting #65bis, R2-092174, Mar. 23-27, 2009, Seoul, Korea.

European patent application No. 10007581.1, European application filing date:Jul. 21, 2010, European Searching Report mailing date:Feb. 9, 2011.

3rd Generation Partnership Project; Technical Specification Group Core Network and Terminals; Non-Access-Stratum (NAS) protocol for Evolved Packet System (EPS); Stage 3 (Release 8), Jun. 2009.

3GPP TSG-RAN WG2 Meeting #66bis R2-094066, "IMS Emergency Call", Jun. 29, 2009.

Office action mailed on Dec. 5, 2012 for the China application No. 201010246596.5, filing date Jul. 30, 2010, p. 1-8.

European patent application No. 12004297.3, European application filing date: Jul. 21, 2010, European Search Report mailing date: Apr. 16, 2013.

Alcatel-Lucent, "IMS Emergency Call", 3GPP TSG-RAN WG2 Meeting #65bis, R2-092173, Mar. 23-27, 2009, Seoul, Korea, XP050340003.

ETSI MCC, "Draft Report of 3GPP TSG RAN WG2 meeting #66bis, Los Angeles, USA, Jun. 29-Jul. 3, 2009", TSG-RAN Working Group 2 Meeting #67, R2-09xxxx, Aug. 4-8, 2009, Shenzhen, China, XP050352264, pp. 1-106.

ETSI TS 123 272 V8.4.0 (Jun. 2009), Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 8.4.0 Release 8), cover page+ p. 1, 7~8 and 25~26.

Office action mailed on Mar. 29, 2013 for the Taiwan application No. 099125433, filing date Jul. 30, 2010, p. 1-15.

* cited by examiner

| Service | Target Service Domain |
|---|---|
| Service A | CS domain |
| Service B | IMS domain |

Table (1)

| Service | Target Service Domain (1$^{st}$ priority) | Target Service Domain (2$^{nd}$ priority) |
|---|---|---|
| Service A | CS domain | IMS domain |
| Service B | IMS domain | CS domain |

Table (2)

FIG. 6

METHOD OF HANDLING CALL ORIGINATION AND RELATED COMMUNICATION DEVICE

CROSS REFERENCE TO RELATED APPLICATIONS

This application claims the benefit of U.S. Provisional Application No. 61/229,725, filed on Jul. 30, 2009 and entitled "Methods for call origination in wireless communications system" the contents of which are incorporated herein.

BACKGROUND OF THE DISCLOSURE

1. Field of the Disclosure

A method used in a wireless communication system and related communication device are provided, and more particularly to, a method of handling call origination in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

For making a mobile origination call, the UE may determine the call type (e.g. circuited switch (CS) voice call or IP multimedia subsystem (IMS) voice call). Namely, the UE decides which call type has to be used before sending a request (e.g. RRC connection request) to the network. If the network supports the determined call type and accepts the request, the network may send an RRC Connection Setup message to the UE. The UE receives the RRC Connection Setup message and sends an RRC Setup complete message in response to the RRC Connection Setup message. If the network does not support the determined call type, the network may send a reject message (e.g. Service Reject message) to the UE. The UE may find another cell which supports the determined call type. If such cell is not found, the UE may indicate a failure to a user.

In the LTE system, levels of services which are provided by the network to the UE are defined as follows: (1) Normal service; (2) Limited service; (3) Operator service. When a UE is switched on, the UE selects a public land mobile network (PLMN) and camp on a "suitable cell" of the PLMN for the normal service. The suitable cell shall fulfill some requirements (basically detailed in 3GPP specification (3GPP TS 23.167), and thus omitted herein). The UE using the normal service may receive system information or registration area information from a public land mobile network (PLMN) as well as receive access stratum (AS) and non-access stratum (NAS) information. If the UE is registered to the network, the UE may receive paging and notification messages from the PLMN and initiate call setup for outgoing calls or the other actions. If the UE is unable to find any suitable cell to camp on, or a universal subscriber identity module (USIM) is not inserted into the UE, or if the location registration is failed, the UE attempts to camp on a cell irrespective of the PLMN, and enters the "limited service" state. In the limited service state, the UE can only make emergency calls.

IP multimedia subsystem (IMS) emergency calls are supported in the specification and the UE may initiate an IMS emergency call on the packet switch (PS) domain if the network supports the IMS emergency call service. An indication is provided to inform the UE that IMS emergency call services are supported. The indication is sent via NAS messaging for the UE using the normal service and/or via a broadcast control channel (BCCH) indicator for the UE using the limited service. The BCCH indicator is set to 'support' if any of the mobility management entities (MMES) in a non-shared environment or one of PLMNs in a shared network environment supports IMS emergency call services. Then, the eNB performs MME selection according to the PLMN selected by the UE. If at the time of the IMS emergency call origination, the UE has established a RRC (Radio Resource Control) connection with a core network that does not support IMS emergency calls, the UE should autonomously release the RRC connection and find a new cell that is capable of handling IMS emergency calls. However, the UE may not find any cell supporting IMS emergency call. In this situation, the IMS emergency call could be delayed. In addition, if the UE is operated in the normal service state, the UE performs a "Tracking Area Update" procedure to notify the core network of a geographical location change when selecting the new cell capable of handling the IMS emergency call in another PLMS. This may delay the IMS emergency call origination as well.

On the other hand, the UE may fail in originating the circuit switch (CS) emergency call in LTE system. In this situation, the UE can only camp on radio technologies (RATs) that provide access to the CS domain (e.g. GERAN or UTRAN) and disable capability of the serving RAT and indicates a failure to the user. Unfortunately, this limits the UE to the exclusive way for originating emergency call and turns down all possibilities of emergency call originations. And, the user is not willing to see the failure.

Besides, when a disaster (e.g. earthquake) occurs, there may be bunch of UEs making calls in the disaster area. The network cannot handle all calls simultaneously caused by the capacity limitation because the network is unable to perform loading balancing. When the UE makes a mobile origination call, the UE determines a call type (e.g. CS voice call or IMS voice call) before sending a request message to the network. When a bunch of UEs originate calls by the same call type, this may cause heavy traffic.

SUMMARY OF THE INVENTION

A method of handling call origination in a wireless communication system and related communication device are provided to avoid emergency call delay.

A method of handling call origination for a mobile device in a wireless communication system is disclosed. The method comprises the steps of originating a service, establishing a radio resource control (RRC) connection corresponding to the service, receiving a message from a network via the RRC connection, determining whether the network supports the service supported in a first service domain, according to the message and performing the service in a second service domain when the network does not support the service in the first service domain, whereby the RRC connection is not released by the mobile device.

A communication device for handling call origination in a wireless communication system is disclosed. The communication device comprises means for originating a service, means for establishing a radio resource control (RRC) connection corresponding to the service, means for receiving a message from a network via the RRC connection, means for determining whether the network supports the service supported in a first service domain, according to the message and means for performing the service in a second service domain when the network does not support the service in the first service domain, whereby the RRC connection is not released by the communication device.

A method of handling call origination for a mobile device in a wireless communication system is disclosed. The method comprises the steps of originating a service, receiving a message corresponding to the origination of the service from a network, determining a target service domain according to the message and performing the service in the target service domain.

A communication device for handling call origination f in a wireless communication system is disclosed. The communication device comprises means for originating a service, means for receiving a message corresponding to the origination of the service from a network, means for determining a target service domain according to the message and means for performing the service in the target service domain.

A method of handling call origination for a mobile device in a wireless communication system is disclosed. The method comprises the steps of originating a service via a first service domain, receiving a message corresponding to the origination of the service from a first network and originating the service via a second service domain according to the message.

A communication device for handling call origination in a wireless communication system is disclosed. The communication device comprises means for originating a service via a first service domain, means for receiving a message corresponding to the origination of the service from a first network and means for originating the service via a second service domain according to the message.

A method of handling call origination for a mobile device in a wireless communication system is disclosed. The mobile device is capable of a normal service state and a limited service state. The method comprises the steps of operating in the normal service state and camping on a first cell of a first network, originating an emergency call, receiving system information corresponding to the limited service state from a second network, wherein the system information indicates that a second cell of the second network supports the emergency call, selecting the second cell when the first cell does not support the emergency call and originating the emergency call via the second cell.

A communication device for handling call origination in a wireless communication system is disclosed. The communication device is capable of a normal service state and a limited service state. The communication device comprises means for operating in the normal service state and camping on a first cell of a first network, means for originating an emergency call, means for receiving system information corresponding to the limited service state from a second network, wherein the system information indicates that a second cell of the second network supports the emergency call, means for selecting the second cell when the first cell does not support the emergency call and originating the emergency call via the second cell.

These and other objectives of the present disclosure will no doubt become obvious to those of ordinary skill in the art after reading the following detailed description of the examples that is illustrated in the various figures and drawings.

BRIEF DESCRIPTION OF THE DRAWINGS

FIG. 6 illustrates tables of an exemplary service domain configuration.

DETAILED DESCRIPTION

Figure 1:
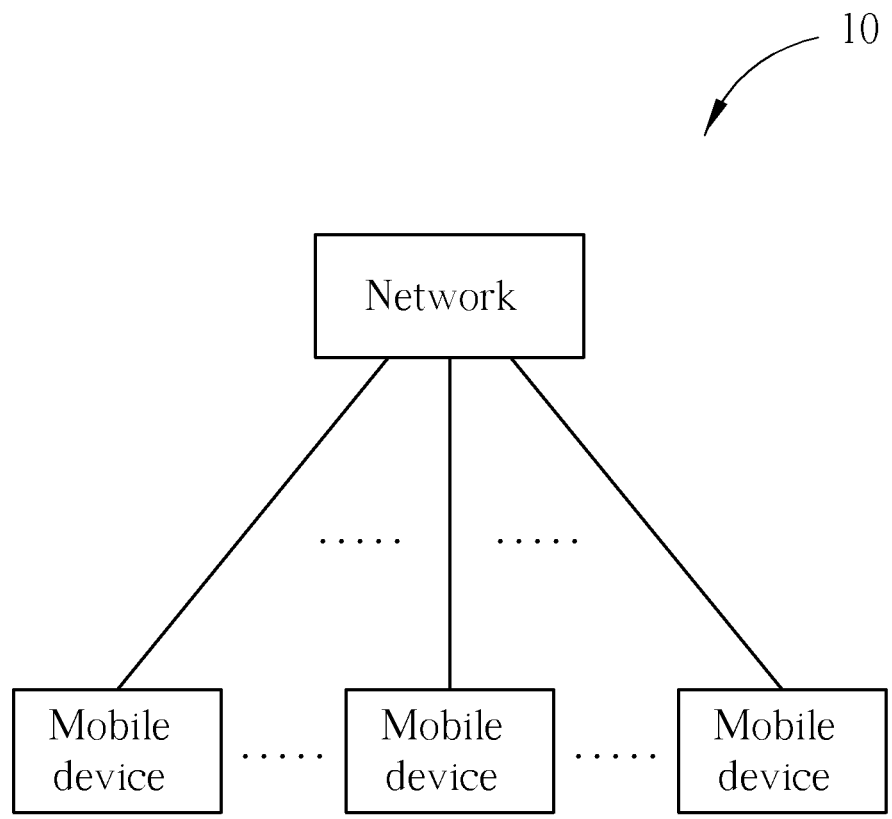
FIG. 1 illustrates a schematic diagram of an exemplary wireless communication system.

Please refer to FIG. 1, which illustrates a schematic diagram of an exemplary wireless communication system 10. Briefly, the wireless communication system 10 is composed of a network and a plurality of mobile devices. The wireless communication system 10 can be a UMTS (Universal Mobile Telecommunications System), an LTE (long-term evolution), LTE-Advance system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference, however, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
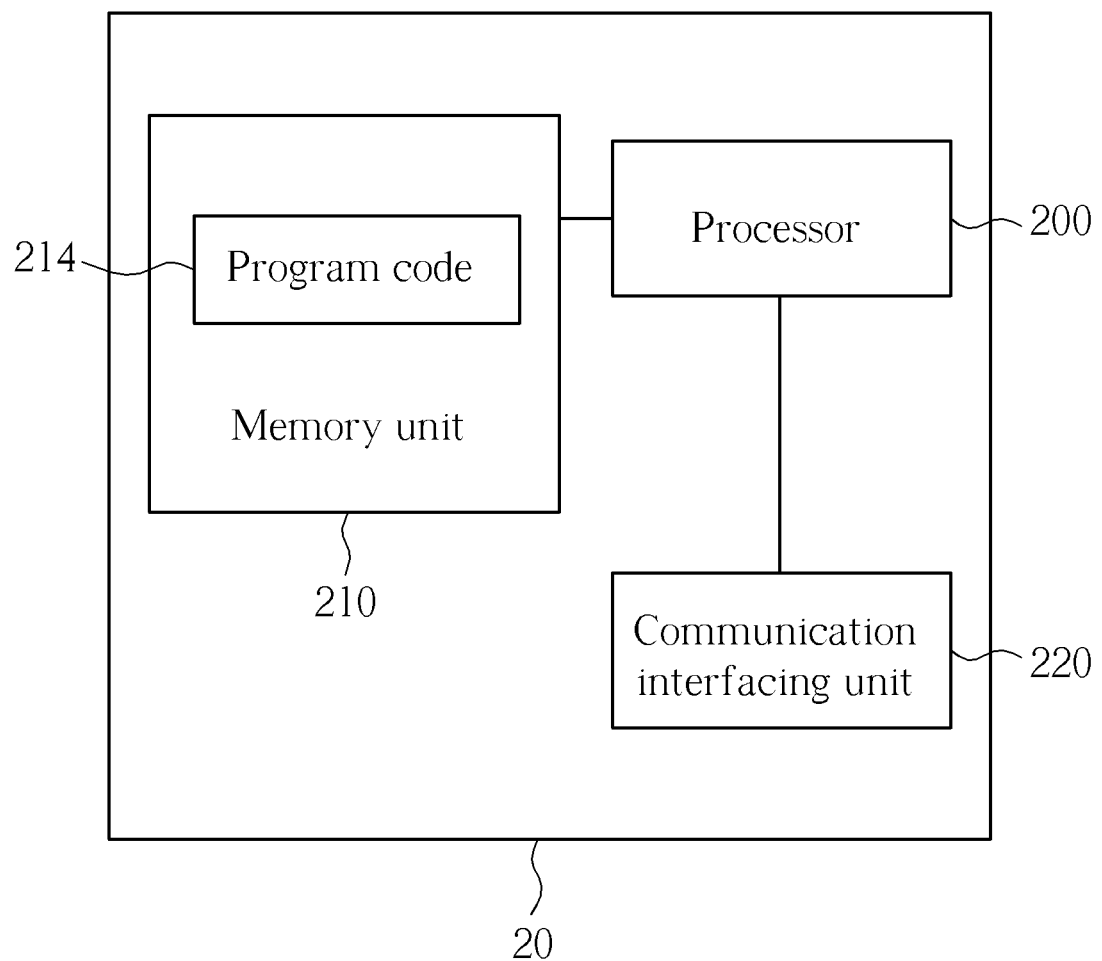
FIG. 2 illustrates a schematic diagram of an exemplary communication device.

Please refer to FIG. 2, which illustrates a schematic diagram of an exemplary communication device 20. The communication device 20 may be the mobile devices or the network shown in FIG. 1 and may include a processor 200 such as a microprocessor or ASIC, a memory unit 210 and a communication interfacing unit 220. The memory unit 210 may be any data storage device that can store program code 214 for access by the processor 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals according to processing results of the processor 200.

Figure 3:
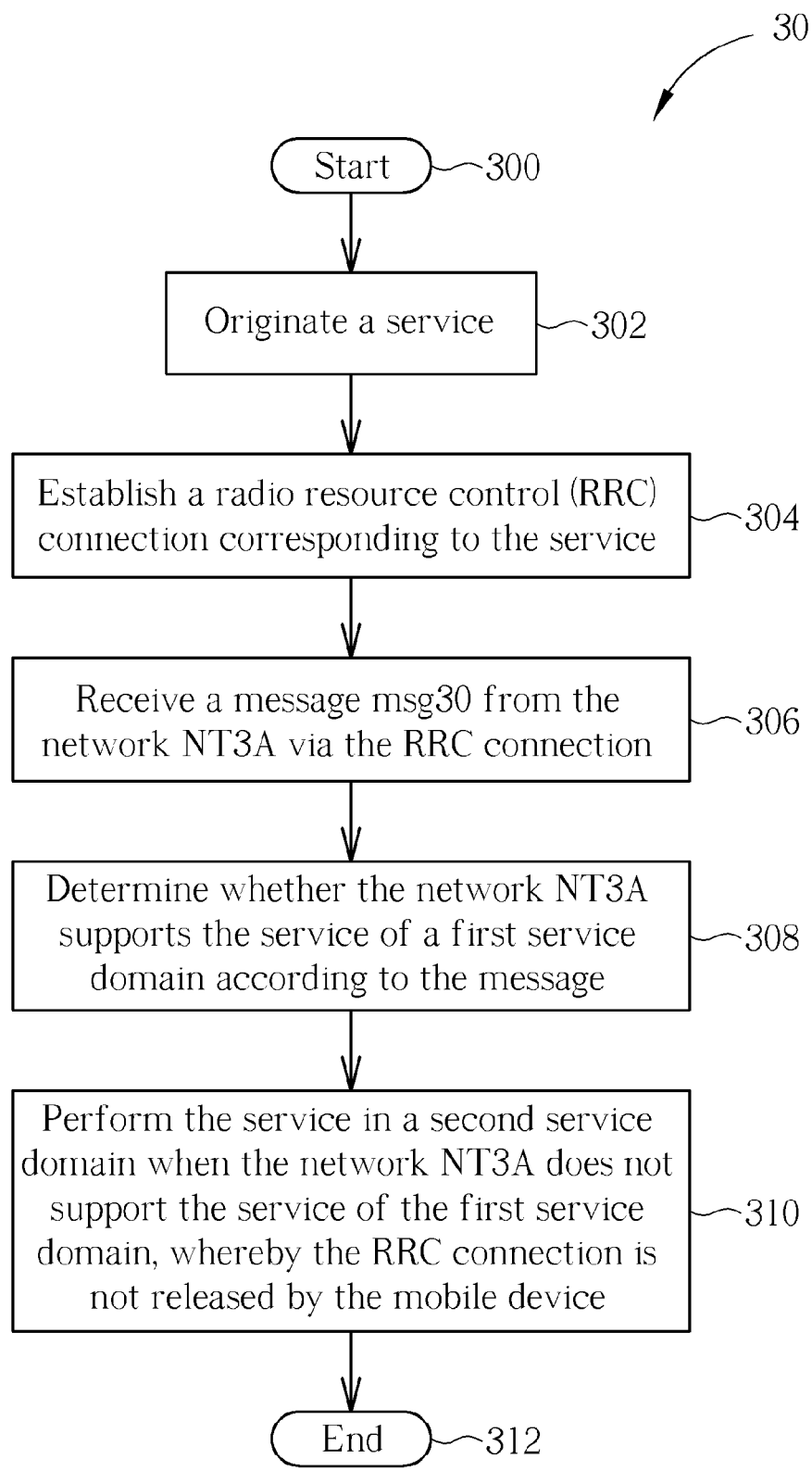
FIG. 3 is a flow chart of an exemplary process.

Please refer to FIG. 3, which is a flow chart of an exemplary process 30. The process 30 is used for handling call origination for a UE in a wireless communication system. In the process 30, assume that the UE initially camps on a cell C3A served by a network NT3A, for convenience of explanation. The network NT3A may be referred as to ETURAN in the LTE system. The process 30 may be compiled into the program code 214 and include the following steps:

Step 300: Start.

Step 302: Originate a service.

Step 304: Establish a radio resource control (RRC) connection corresponding to the service.

Step 306: Receive a message msg30 from the network NT3A via the RRC connection.

Step 308: Determine whether the network NT3A supports the service of a first service domain according to the message.

Step 310: Perform the service in a second service domain when the network NT3A does not support the service of the first service domain, whereby the RRC connection is not released by the mobile device.

Step 312: End.

According to the process 30, the UE may originate the service and establish the RRC connection corresponding to the service. The service may be referred as to an emergency call, a voice call, a video call, unstructured supplementary service data (USSD) supplementary service, CS data call, short message service (SMS) service, or location service (LCS), but not limited herein. The first service domain may be referred as to an IP multimedia subsystem (IMS) domain or a circuit switched (CS) domain. The second service domain may be referred as to the IMS domain or the CS domain. Then, the UE may receive the message msg30 from the network NT3A via the RRC connection. The network NT3A may be referred as to the EUTRAN. The message msg30 may indicate whether the network NT3A supports the service of the first service domain (e.g. IMS emergency call). The message msg30 may be referred as to a broadcast message or a non-access stratum (NAS) message, for example, ATTACH ACCEPT message or tracking area update (TAU) ACCEPT message. When the message msg30 indicates that the network NT3A supports the service of the first service (e.g. IMS emergency call), the UE may perform the service in the first service domain (e.g. IMS emergency call). When the message msg30 indicates that the network NT3A does not support the service of the first service domain (e.g. IMS emergency call), the UE may perform the service in the second service domain (e.g. CS emergency call). In other words, the UE may determine the service domain after acquiring network capability rather than determine the service domain when originating the service. Furthermore, when the first service domain is not supported by the network NT3A, the UE may switch to the second service domain and originate the service of the second service domain via the RRC connection instead of automatically releasing the RRC connection. This avoids the UE automatically releasing the RRC connection and thereby eliminates a service delay caused by the automatic RRC connection release. Alternatively the UE may switch to the second service domain, automatically release the RRC connection and find another cell supporting the service of the second service domain.

When the second service domain is the CS domain, the UE may perform the service in the CS domain by triggering a CS fallback to a legacy network NT3B or automatically selecting a cell C3B of the network NT3B supporting the service of the CS domain. The network NT3B may be referred as to GSM EDGE Radio Access Network (GERAN), UMTS Terrestrial Radio Access Network (UTRAN) or Code division multiple Access (CDMA) 2000 or any networking supporting the service of the CS domain. In LTE architecture, the CS fallback enables the provisioning of voice and traditional domain service (e.g. video call, USSD, SMS or location service). To provide those services, the LTE system reuses CS infrastructure when the UE is served by the network NT3A (e.g. E-TURAN). The CS fallback allows the UEs to transition to the network NT3B (e.g. GREAN, UTRAN or CDMA2000) to receive voice services. A CS fallback enabled terminal is connected to the network NT3A (E-UTRAN) and may use the network NT3B (e.g. GREAN, UTRAN or CDMA2000) to connect the CS domain. But this function is only available in the case that the network (e.g. ETURAN) coverage is overlapped by the network NT3B (e.g. GREAN, UTRAN or CDMA2000) coverage. The CS Fallback and IMS based services can co-exist in the network NT3A. A UE capable of the CS fallback and the IMS would follow the procedures for domain selection for mobile originating calls. When the UE is performing CS fallback procedure for mobile originating Call for the purpose of emergency call, the UE needs to indicate to the mobility management entity (MME) that this CS fallback request is for emergency purpose. In this situation, the MME also indicates to the network NT3A (e.g. E-UTRAN) via the appropriate message (e.g. S1-AP) that this CS fallback procedure is for emergency purpose. In some examples, the network NT3A may send the UE a CS fallback command (e.g. MobilityFromEUTRACommand or RRCConnectionRelease) which indicates the CS fallback is allowed. Then the UE may transfer the RRC connection from the network NT3A (e.g. E-TURAN) to the network NT3B (e.g. GREAN, UTRAN or CDMA2000).

In some examples, the network NT3A may reject the CS fallback request and send a reject message (e.g. SERVICE REJECT message) to inform the UE that the CS fallback is rejected. When the UE is notified that the CS fallback is rejected, the UE may select the cell C3B of the network NT3B. The network NT3B may be referred as to GERAN, UTRAN or CDMA2000 or any network supporting the service of the CS domain. In other words, the UE may automatically select the cell C3B after knowing that the network NT3A does not support the service of the first domain or after the rejection of the CS fallback. Certainly, the network NT3B may be referred as to a network supporting the service of the IMS domain as well. Namely, the UE select another cell (e.g. cell C3B) to originate the service of the IMS domain after the CS fallback is rejected.

Figure 4A:
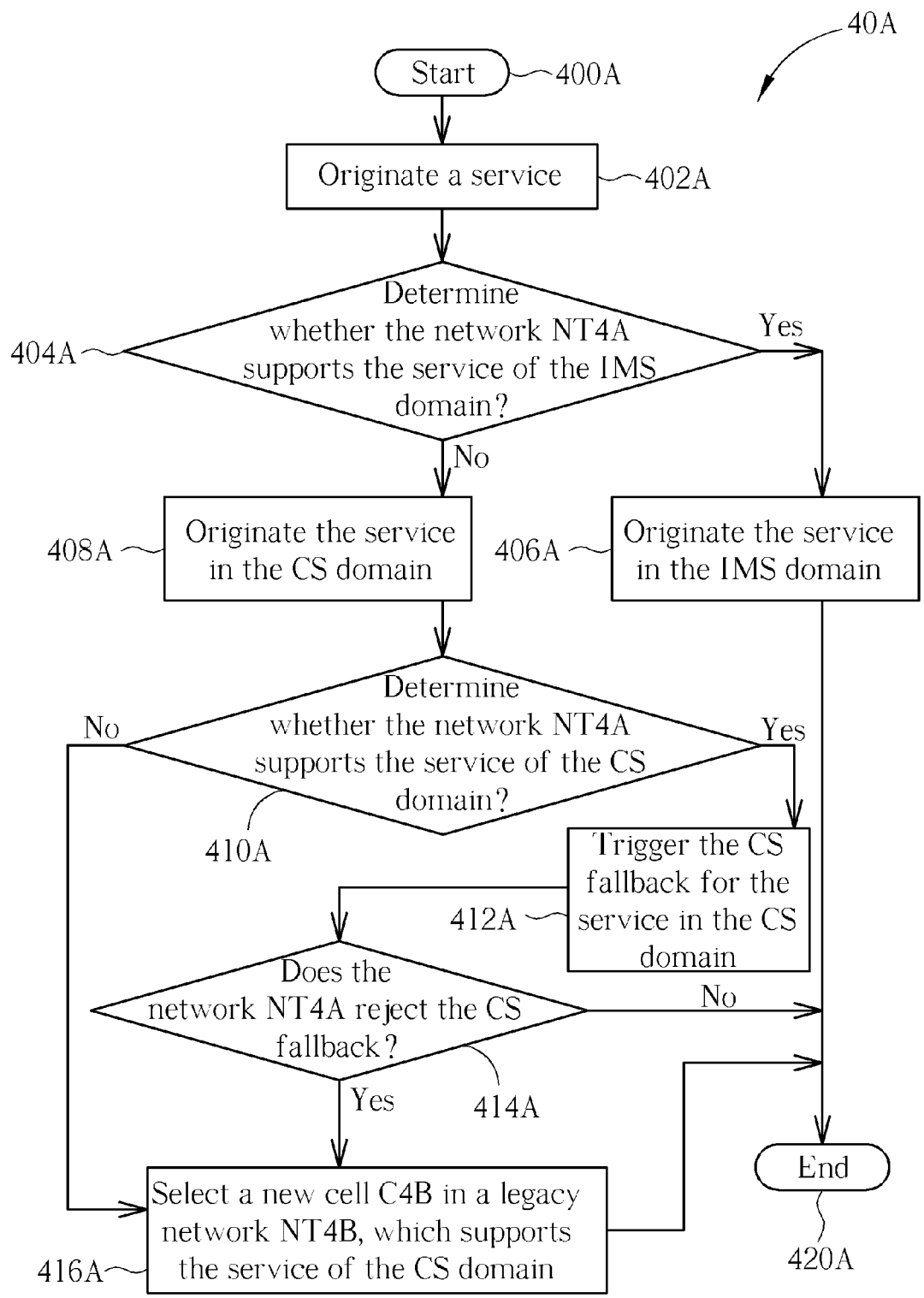
FIG. 4A is a flow chart of an exemplary process.

Assuming the first service domain is the IMS domain and the second service domain is the CS domain, the aforementioned description can be further exemplified by a process 40A. Please refer to FIG. 4A, which is a flow chart of the exemplary process 40A used for handling call origination for a UE in a wireless communication system. In the process 40A, the UE initially camps on a cell C4A served by the network NT4A that may be referred as to ETURAN in the LTE system. The process 40A may be compiled into the program code 214 and include the following steps:

Step 400A: Start.

Step 402A: Originate a service.

Step 404A: Determine whether the network NT4A supports the service of the IMS domain? If so, go to the Step 406A; otherwise, go to the Step 408A.

Step 406A: Originate the service in the IMS domain and go to the Step 420A.

Step 408A: Originate the service in the CS domain.

Step 410A: Determine whether the network NT4A supports the service of the CS domain? If so, go to the Step 412A; otherwise, go to the Step 416A.

Step 412A: Trigger the CS fallback for the service in the CS domain.

Step 414A: "Does the network NT4A reject the CS fallback?" If yes, go to the Step 416A; otherwise, go to the Step 420A.

Step 416A: Select a new cell C4B in a legacy network NT4B, which supports the service of the CS domain.

Step 420A: End.

According to the process 40A, the UE does not determine the service domain at the beginning when originating the service. Instead, the UE may determine the service domain according to the network capability. If the network supports the IMS domain, the UE originates the service in the IMS domain. If the network does not support the IMS domain, the UE originate the service in the CS domain. The cell C4B is served by the network NT4B supporting the service of the CS domain. The network NT4B may be referred as to GERAN, UTRAN or CDMA2000. The detailed description can be found above, and thus omitted herein. The service may be an emergency call service.

Figure 4B:
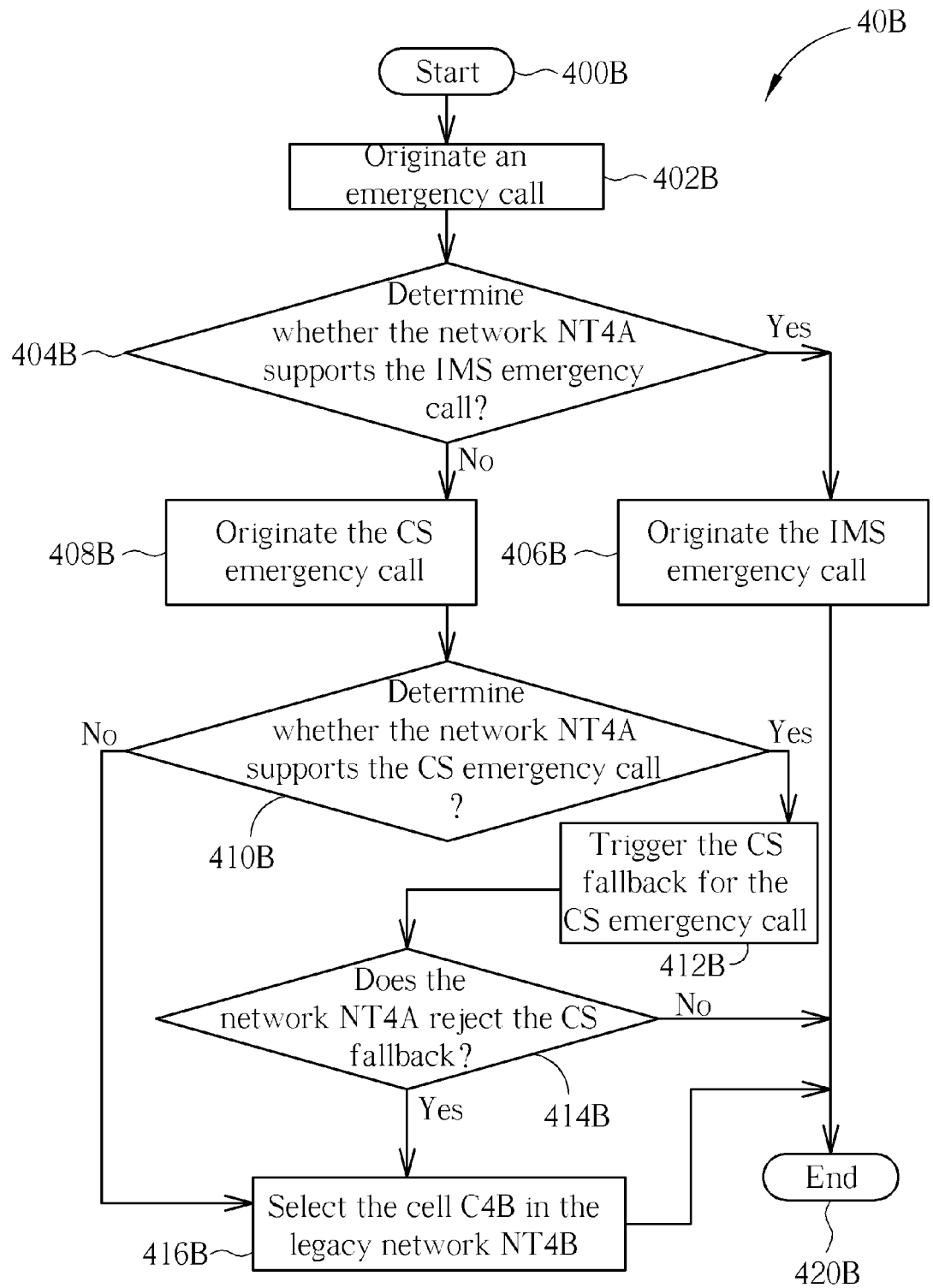
FIG. 4B is a flow chart of an exemplary process.

Please refer to FIG. 4B, which is a flow chart of the exemplary process 40B. The process 40B is used for handling call origination for a UE in a wireless communication system. In the process 40B, the UE initially camps on the cell C4A served by the network NT4A. The process 40B may be compiled into the program code 214 and include the following steps:

Step 400B: Start.
Step 402B: Originate an emergency call.
Step 404B: Determine whether the network NT4A supports the IMS emergency call? If so, go to the Step 406B; otherwise, go to the Step 408B.
Step 406B: Originate the IMS emergency call and go to the Step 420B.
Step 408B: Originate the CS emergency call.
Step 410B: Determine whether the network NT4A supports the CS emergency call? If so, go to the Step 412B; otherwise, go to the Step 414B.
Step 412B: Trigger the CS fallback for the CS emergency call.
Step 414B: "Does the network NT4A reject the CS fallback?" If yes, go to the Step 416B; otherwise, go to the Step 420B.
Step 416B: Select the cell C4B in the legacy network NT4B.
Step 420B: End.

Likewise, the detailed description can be found above, and thus omitted herein.

Figure 5:
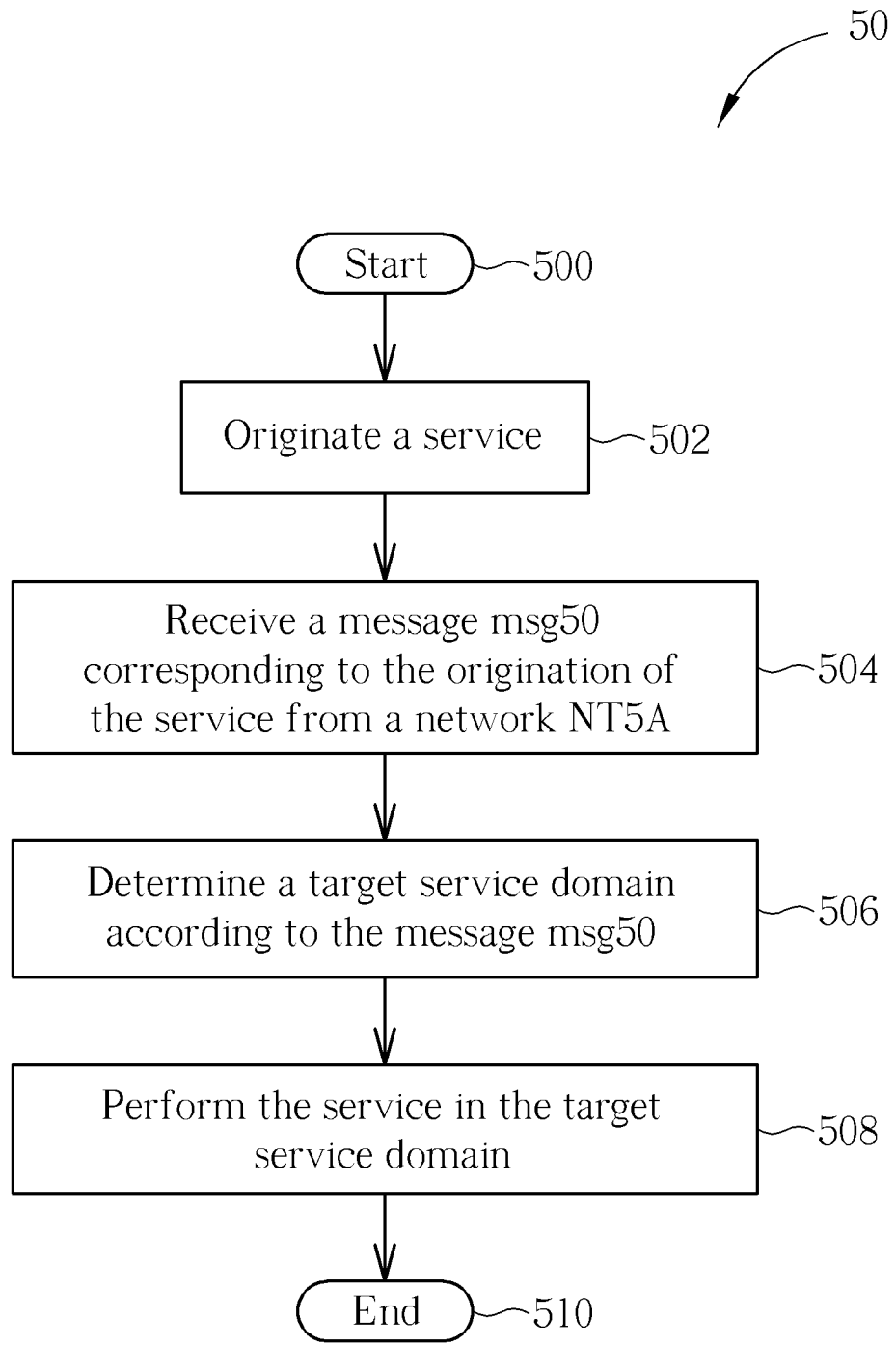
FIG. 5 is a flow chart of an exemplary process.

Please refer to FIG. 5, which is a flow chart of an exemplary process 50. The process 50 is used for handling call origination for a UE in a wireless communication system. The process 50 may be compiled into the program code 214 and include the following steps:

Step 500: Start.
Step 502: Originate a service.
Step 504: Receive a message msg50 corresponding to the origination of the service from a network NT5A.
Step 506: Determine a target service domain according to the message msg50.
Step 508: Perform the service in the target service domain.
Step 510: End.

According to the process 50, the UE may receive the message msg50 from the network NT5A after originating the service. The network NT5A may be referred as to ETURAN in the LTE system. The UE may determine the target service domain according to the message msg50 sent by the network NT5A. The service may be referred as to an emergency call, a voice call, a video call, USSD supplementary service, CS data call, SMS service, or location service, but not limited herein. The target service domain could be the IMS domain or the CS domain. In other word, the network NT5A indicates to the UE whether the service (e.g. emergency call) should be originated in the IMS domain or the CS domain, by sending the message msg50. Preferably, the message msg50 may be referred as to an RRC connection setup message. After receiving the RRC connection setup message, an RRC layer of the UE indicates to a NAS layer of the UE that the service is originated in the CS domain or IMS domain. The NAS layer originates the service (e.g. emergency call) in the target service domain indicated by the network NT5A. In other words, when the UE originates a service (e.g. emergency call), the UE does not determine which service domain should be used until the UE receives the message msg50 from the network NT5A, instead of determining the service domain at the beginning of the service origination. Consequently, the network may distribute the calls in the IMS domain or the CS domain through the RRC connection setup message, thereby achieving load balancing.

If the message msg50 indicates that the UE should perform the service in the CS domain, the UE may trigger the CS fallback to a network NT5B or handover to the network NT5B through a handover procedure, a cell changed order procedure or a redirection procedure when the UE operates in a RAT only supporting PS domain services. The network NT5B may be referred as to GERAN, UTRAN or CDMA2000. Preferably, the handover procedure or the cell changed order procedure is triggered by a "MobilityFromEUTRA" message sent by the network NT5A and the redirection procedure is triggered by a "RRCConnectionRelease" message sent by the network NT5A. In some examples, the message msg50 may be referred as to a broadcast message, a dedicated message, an RRC message or an NAS message. In some examples, the message msg50 may also include service domain configuration that may include at least one of target service domains, service types, or the priority order of the target service domains. The UE may be configured according to the service domain configuration included in the message msg50.

Please refer to FIG. 6, which illustrates tables of an exemplary service domain configuration 60. A table (1) includes service type (service A and service B) and target service domain (CS domain and IMS domain). As seen in the table (1), the CS domain is assigned to the service A by the network (e.g. network NT5A) and the IMS domain is assigned to the service B by the network (e.g. network NT5A). A table (2) includes service type (service A and service B), target service domain (CS domain and IMS domain) and priority order. In the table (2), the service A has the CS domain as the first priority and the IMS domain as the second priority. This means that the UE may originate the service A in the CS domain first. If the service origination of the CS domain is rejected, the UE may originate the service A in the IMS domain. For the service B, the IMS domain has higher priority than the CS domain. So the UE may originate the service B in the IMS domain first. If the UE fails in originating the service B in the IMS domain, the UE may use the CS domain instead.

Figure 7:
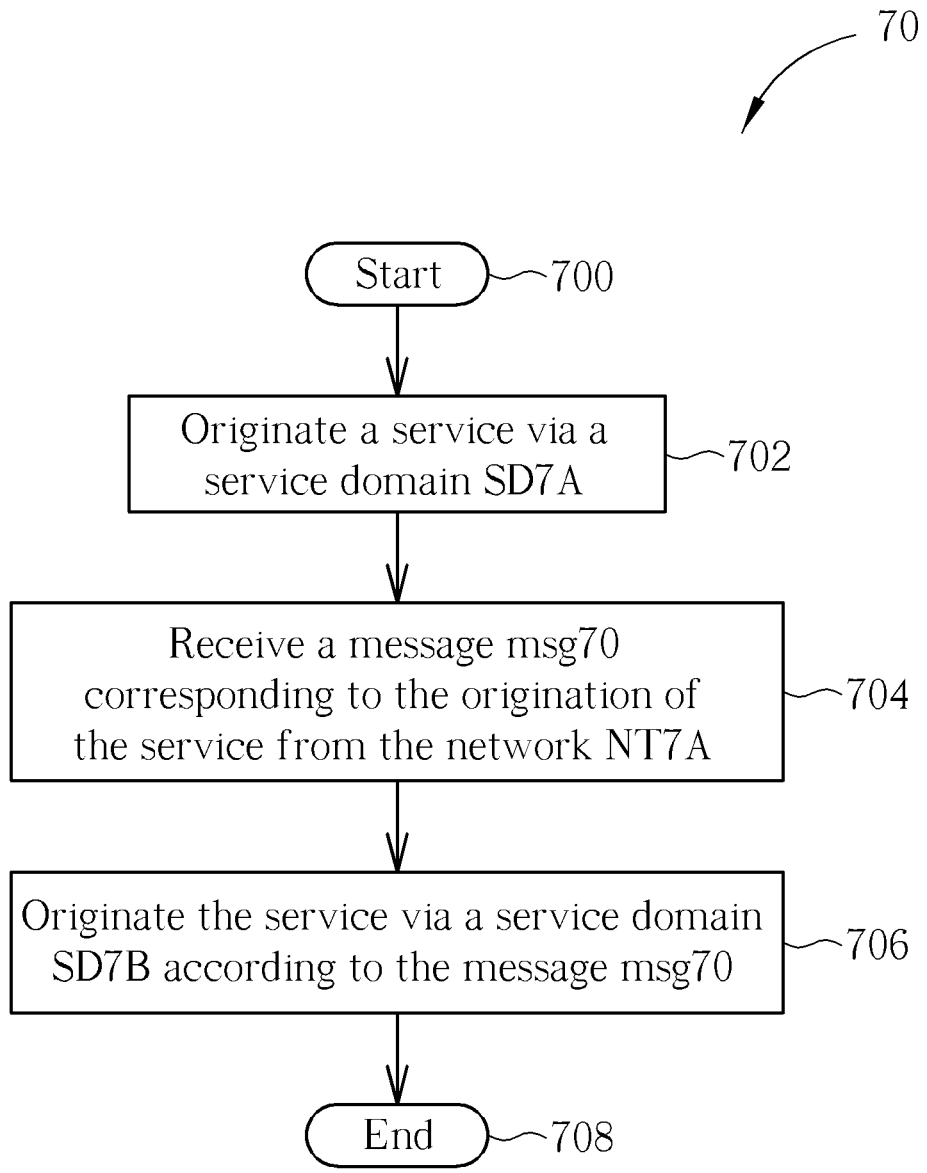
FIG. 7 is a flow chart of an exemplary process.

Please refer to FIG. 7, which is a flow chart of an exemplary process 70. The process 70 is used for handling call origination for a UE in a wireless communication system. In the process 70, the UE initially camps on a cell C7A served by a network NT7A that may be referred as to a EUTRAN. The process 70 may be compiled into the program code 214 and include the following steps:

Step 700: Start.
Step 702: Originate a service via a service domain SD7A.
Step 704: Receive a message msg70 corresponding to the origination of the service from the network NT7A.
Step 706: Originate the service via a service domain SD7B according to the message msg70.
Step 708: End.

According to the process 70, the UE may originate the service via the service domain SD7A first. Then the UE may receive the message msg70 from the network NT7A and then originate the service via the service domain SD7B instead. Preferably, the UE is operated in a normal service state. The service may be referred as to an emergency call, a voice call, a video call, USSD supplementary service, CS data call, SMS service, or location service, but not limited herein. The message msg70 is sent by the network NT7A and used for indicating a change to the service domain SD7B or a change to a network NT7B supporting the service domain SD7B. The service domain SD7A and the service domain SD7B may be referred as to the IMS domain or the CS domain. The network NT7B may be referred as to GREAN, UTRAN or CDMA2000. Even though the UE may determine the service domain already, the UE may switch to another service domain according to the message msg70 sent by the network. As a result, the network may re-distribute the service domain through the message msg70, thereby achieving load balancing.

In addition, when the UE originates the service (e.g. emergency call) via the service domain SD7A (e.g. IMS domain), the UE may send a request message to the network NT7A to inform the network NT7A of the service origination. The request message may be referred to an RRC message (e.g. RRC CONNECTION REQUEST message) or an NAS message (e.g. EXTENDED SERVICE REQUEST message, SERVICE REQUEST message or EPS session management (ESM) message). In this situation, the message msg70 may be referred as a RRC message (e.g. RRC CONNECTION SETUP message, RRC CONNECTION RELEASE message or RRC CONNECTION REJECT message) or a NAS message (e.g. SERVICE REJECT message or ESM message). When the UE originates the service via the service domain SD7B (e.g. CS domain), the UE may send a call establishment request message corresponding to the service domain SD7B. The call establishment request message may be referred as to an NAS message (e.g. CM SERVICE REQUEST message, EXTENDED SERVICE REQUEST message, SERVICE REQUEST message, or ESM message).

In some examples, the network NT7A is the EUTRAN; the network NT7B may use the different RATs than the EUTRAN; the message msg70 is the RRC CONNECTION RELEASE message; the service is the emergency call; the service domain SD7A is the IMS domain. That is, the UE in the EUTRAN originates the IMS emergency call and receives the RRC CONNECTION RELEASE message. The RRC CONNECTION RELEASE message includes "redirectedCarrierInfo" to redirect the UE to GREAN, UTRAN or CDMA2000. Then, the UE selects a new cell C7B served by the network NT7B network and originates the emergency call in the service domain SD7B without user's intervention. The service domain SD7B may be the CS domain or the IMS domain. If the service domain SD7B is the CS domain, the network NT7B could be a network, such as GREAN, UTRAN or CDMA2000, supporting CS emergency call. If the service domain SD7A is the IMS domain, the network NT7B could be a network supporting the IMS emergency call.

In some examples, the network NT7A is the EUTRAN; the network NT7B may use the different RATs than the EUTRAN; the service domain SD7A is the CS domain (e.g. the UE may originate the service in the CS domain by triggering the CS fallback); the message msg70 is the SERVICE REJECT message and includes a cause indicating that the CS fallback is rejected by the network NT7A, for example, that the CS domain is not available or temporarily not available, that the CS fallback is not supported by the network NT7A, or that the IMS domain is used instead. That is, the UE in the EUTRAN originates the service in the CS domain by triggering the CS fallback. Then, the network sends the SERVICE REJECT message to the UE to reject the CS fallback. The service domain SD7B may be the CS domain or the IMS domain. If the service domain SD7B is the CS domain, the UE may select a new cell C7B served by the network NT7B (e.g. GREAN, UTRAN or CDMA2000) instead of the EUTRAN and originate the service in the CS domain without user's intervention. If the service domain is the IMS domain, the UE originates the service in the IMS domain without the user's intervention. If the UE fails in originating the service in the IMS domain, the UE selects a new cell C7B served by the network NT7B (e.g. GREAN, UTRAN or CDMA2000).

Figure 8:
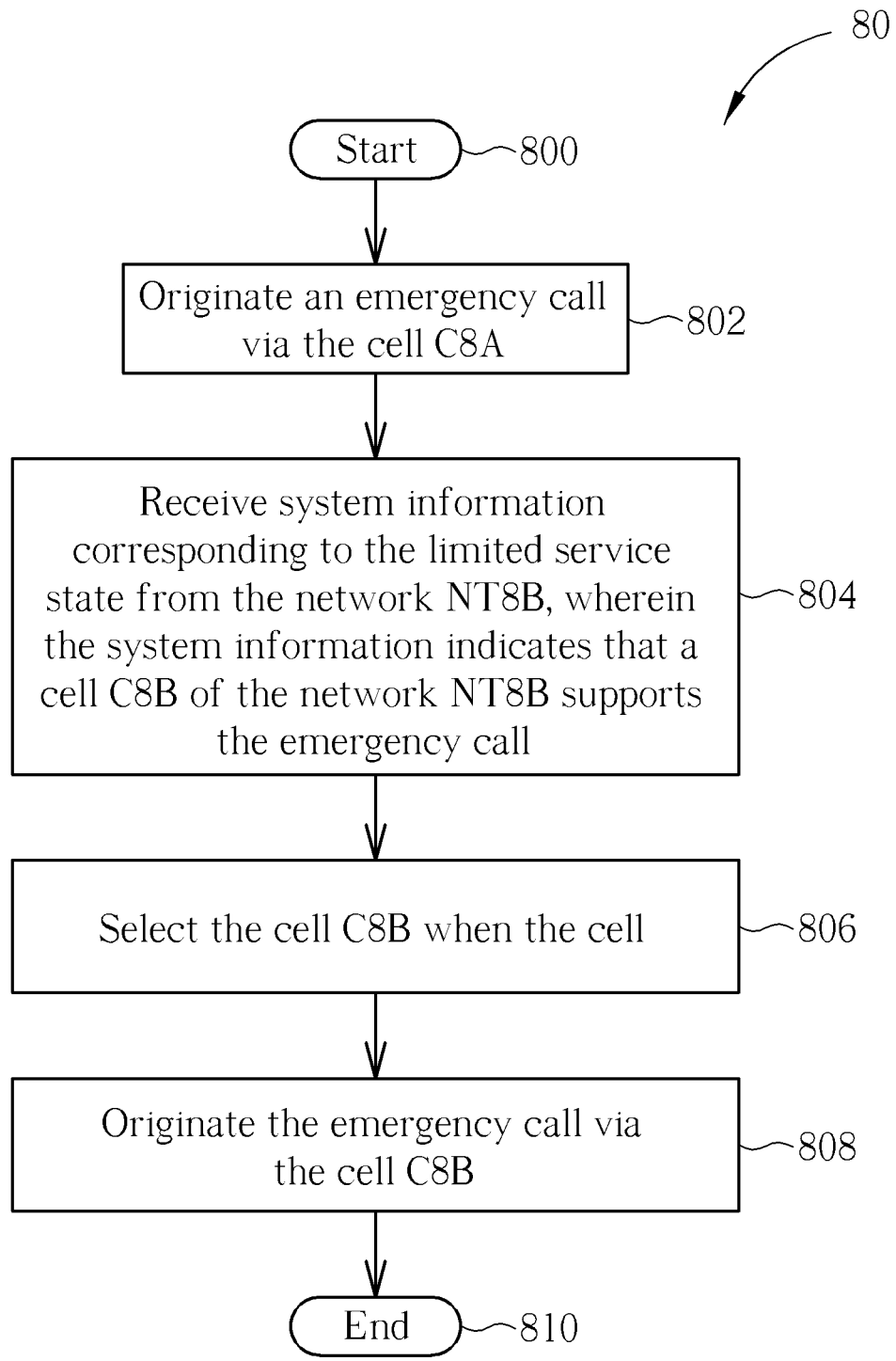
FIG. 8 is a flow chart of an exemplary process.

Please refer to FIG. 8, which is a flow chart of an exemplary process 80. The process 80 is used for handling call origination for a mobile device in a wireless communication system. The UE is capable of a normal service state and a limited service state and camps on a cell C8A served by a network NT8A. The network NT8A may be referred as to a EUTRAN. The process 80 may be compiled into the program code 214 and include the following steps:

Step 800: Start.

Step 802: Originate an emergency call via the cell C8A.

Step 804: Receive system information corresponding to the limited service state from the network NT8B, wherein the system information indicates that a cell C8B of the network NT8B supports the emergency call.

Step 806: select the cell C8B when the cell C8A does not support the emergency call.

Step 808: Originate the emergency call via the cell C8B.

Step 810: End.

According to the process 80, the UE may originate the emergency call via the cell C8A. Preferably, the UE is operated in the normal service state where the UE can not know if there is another cell (e.g. cell C8B) supporting the emergency call and the emergency call may be referred as to the IMS emergency call or the CS emergency call. Then, the UE may receive the system information from the network NT8B. The system information corresponds to the limited service state. In the limited service, the UE can read the system information and be informed of whether the cell C8B supports the emergency call or not. Namely, the UE in the normal service state is able to receive the system information which used to be received by the UE operated in the limited service state. The system information may indicate that the cell C8B of the network NT8B supports the emergency call. When the cell C8A does not support the emergency call, the UE may select the cell C8B and originate the emergency call via the cell C8B directly without any signaling procedure (e.g. TAU procedure). Therefore, the UE operated in the normal service need not switch to the limited service state for receiving system information. Further, the UE operated in the normal service state can know that the cell C8B supports the IMS emergency call, according to the system information of the cell C8B.

In addition, the UE may receive a NAS message from a network NT8A and determine that the cell C8A or the network NT8A does not support the emergency call, according to the NAS message or a registration state between the network NT8A and the UE. The NAS message may be referred as to SERVICE REJECT message, ATTACH ACCEPT message or TAU ACCEPT message. For example, the network rejects the emergency call by sending the SERVICE REJECT message, or the network indicates that emergency call is not supported through the ATTACH ACCEPT message or TAU ACCEPT message. In some examples, the UE may be operated in RRC_CONNECTED mode. In this situation, the UE may automatically release the RRC connection before originating the emergency call.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes, the processed results of which can handle call origination for the communication device 20.

To sum up, when the network currently serving the UE does not support the service of the IMS domain, the UE may trigger the CS fallback or select a new cell supporting the service of the CS domain. This may avoid a RRC connection release of the UE and also a following search for the cell supporting IMS emergency call, so as to eliminate the emergency call delay. In addition, the UE may determine the service domain or the call type according to the message sent by the network. Thus, the network may distribute the call type among the emergency calls and manage the emergency call according to the current traffic, thereby achieving load balancing. According to examples of the present disclosure, the UE operated in the normal service state may receive the system information of a target cell which indicates whether the target cell supports the IMS emergency call or not, when originating an IMS emergency call via a cell that does not support the IMS emergency call service. Then, the UE operated in the normal service may select the target cell for IMS emergency call origination when the serving cell does not support the IMS emergency call. Compared with the prior art, the UE of the present disclosure has no need of bother switching to the limited service state for reception of the system information.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling call origination for a mobile device in a wireless communication system, the mobile device camping on a first cell, the method comprising the steps of:
   originating a service;
   establishing a radio resource control (RRC) connection corresponding to the service;
   receiving a non-access stratum (NAS) message via the RRC connection or a broadcast message from a first network;
   determining whether the first network supports the service of an IP multimedia subsystem (IMS) domain, according to the NAS message or the broadcast message;
   performing the service in a circuit switched (CS) domain when the first network does not support the service of the IMS domain;
   receiving a CS fallback command;
   transferring the RRC connection from the first network to a second network which provides the service in the CS domain, according to the CS fallback command; and
   selecting a second cell which provides the service in the CS domain;
   wherein transferring the RRC connection from the first network to the second network which provides the service in the CS domain, according to the CS fallback command, comprises:
      transferring the RRC connection through a handover procedure, redirection procedure or a cell changed order procedure, wherein the second network uses other radio access technology (RAT) than the one used in the first network and the handover procedure or the cell changed order procedure is triggered by a "MobilityFromEUTRA" message sent by the first network.

2. The method of claim 1, further comprising the step of selecting a second cell which provides the service in the CS domain.

3. A communication device for handling call origination in a wireless communication system, the communication device camping on a first cell and comprising:
   means for originating a service;
   means for establishing a radio resource control (RRC) connection corresponding to the service;
   means for receiving a non-access stratum (NAS) message via the RRC connection or a broadcast message from a first network;
   means for determining whether the first network supports the service of an IP multimedia subsystem (IMS) domain, according to the NAS message or the broadcast message;
   means for performing the service in a circuit switched (CS) domain when the first network does not support the service of the IMS domain;
   means for receiving a CS fallback command;
   means for transferring the RRC connection from the first network to a second network which provides the service in the CS domain, according to the CS fallback command; and
   means for selecting a second cell which provides the service in the CS domain;
   wherein the means for transferring the RRC connection from the first network to the second network which provides the service in the CS domain, according to the CS fallback command, comprises:
      means for transferring the RRC connection through a handover procedure, redirection procedure or a cell changed order procedure, wherein the second network uses other radio access technology (RAT) than the one used in the first network and the handover procedure or the cell changed order procedure is triggered by a "MobilityFromEUTRA" message sent by the first network.

4. The communication device of claim 3, wherein the service is an emergency call, a voice call, a video call, Unstructured Supplementary Service Data (USSD) supplementary service, CS data call, Short Message Service (SMS) service, or location service; the message is a broadcast message, a Radio Resource Control (RRC) message or a non-access stratum (NAS) message.

5. A method of handling call origination for a mobile device in a wireless communication system, the method comprising the steps of:
   originating a service;
   establishing a radio resource control (RRC) connection corresponding to the service;
   receiving an RRC connection setup message corresponding to the origination of the service from a first network;
   determining a target service domain is an IP multimedia subsystem (IMS) domain or a circuit switched (CS) domain according to the RRC connection setup message;
   performing the service in the target service domain;
   receiving a CS fallback command;
   transferring the RRC connection from the first network to a second network which provides the service in the CS domain, according to the CS fallback command; and
   selecting a second cell which provides the service in the CS domain;

wherein transferring the RRC connection from the first network to the second network which provides the service in the CS domain, according to the CS fallback command comprises:
  transferring the RRC connection through a handover procedure, redirection procedure or a cell changed order procedure, wherein the second network uses other radio access technology (RAT) than the one used in the first network and the handover procedure or the cell changed order procedure is triggered by a "MobilityFromEUTRA" message sent by the first network.

6. The method of claim 5, wherein the step of originating the service in the target service domain comprises:
  originating the service in the target service domain by a CS fallback in the first network when the target service domain is the CS domain.

7. A communication device for handling call origination in a wireless communication system, the communication device comprising:
  means for originating a service;
  means for establishing a radio resource control (RRC) connection corresponding to the service;
  means for receiving an RRC connection setup message corresponding to the origination of the service from a first network;
  means for determining a target service domain is an IP multimedia subsystem (IMS) domain or a circuit switched (CS) domain according to the RRC connection setup message;
  means for performing the service in the target service domain;
  means for receiving a CS fallback command;
  means for transferring the RRC connection from the first network to a second network which provides the service in the CS domain, according to the CS fallback command; and
  means for selecting a second cell which provides the service in the CS domain;
  wherein the means for transferring the RRC connection from the first network to the second network which provides the service in the CS domain, according to the CS fallback command comprises:
  means for transferring the RRC connection through a handover procedure, redirection procedure or a cell changed order procedure, wherein the second network uses other radio access technology (RAT) than the one used in the first network and the handover procedure or the cell changed order procedure is triggered by a "MobilityFromEUTRA" message sent by the first network.

8. The communication device of claim 7, wherein the service is an emergency call, a voice call, a video call, Unstructured Supplementary Service Data (USSD) supplementary service, Circuited Switch (CS) data call, Short Message SMS service, or location service; the message is a broadcast message, dedicated message, RRC message or non-access stratum (NAS) message, and indicates the target service domain, candidates of the target service domain corresponding to a plurality of service types or candidates of the target service domain corresponding to priority order of service domains.

9. A method of handling call origination for a mobile device in a wireless communication system, the mobile device camping on a first cell, the method comprising the steps of:
  originating a service via an IP multimedia subsystem (IMS) domain;
  establishing a radio resource control (RRC) connection corresponding to the service;
  receiving a message corresponding to the origination of the service from a first network;
  originating the service via a circuit switched (CS) domain according to the message after the service is determined to be originated in the IMS domain;
  receiving a CS fallback command;
  transferring the RRC connection from the first network to a second network which provides the service in the CS domain, according to the CS fallback command; and
  selecting a second cell which provides the service in the CS domain;
  wherein transferring the RRC connection from the first network to the second network which provides the service in the CS domain, according to the CS fallback command, comprises:
  transferring the RRC connection through a handover procedure, redirection procedure or a cell changed order procedure, wherein the second network uses other radio access technology (RAT) than the one used in the first network and the handover procedure or the cell changed order procedure is triggered by a "MobilityFromEUTRA" message sent by the first network.

10. A communication device for handling call origination in a wireless communication system, the communication device camping on a first cell and comprising: means for originating a service via an IP multimedia subsystem (IMS) domain;
  means for establishing a radio resource control (RRC) connection corresponding to the service;
  means for receiving a message corresponding to the origination of the service from a first network;
  means for originating the service via a circuit switched (CS) domain according to the message;
  means for receiving a CS fallback command;
  means for transferring the RRC connection from the first network to a second network which provides the service in the CS domain, according to the CS fallback command; and
  means for selecting a second cell which provides the service in the CS domain;
  wherein means for transferring the RRC connection from the first network to the second network which provides the service in the CS domain, according to the CS fallback command, comprises:
  means for transferring the RRC connection through a handover procedure, redirection procedure or a cell changed order procedure, wherein the second network uses other radio access technology (RAT) than the one used in the first network and the handover procedure or the cell changed order procedure is triggered by a "MobilityFromEUTRA" message sent by the first network.

11. The communication device of claim 10, wherein the service is an emergency call, a voice call, a video call, Unstructured Supplementary Service Data (USSD) supplementary service, Circuited Switch (CS) data call, Short Message Service (SMS) service, or location service.

12. The communication device of claim 10, wherein the message indicating a change to the second network.

13. The communication device of claim 10, further comprising means for using the CS fallback to originate the service in the CS domain.

14. The communication device of claim 13, wherein the message is a Service Reject message.

* * * * *